United States Patent [19]
Marciandi et al.

[11] Patent Number: 5,556,666
[45] Date of Patent: Sep. 17, 1996

[54] PROCESS FOR PREPARING COLOR CONTRASTS ON ARTICLES OBTAINED BY MOLDING FROM POLYMERIZABLE COMPOSITIONS

[75] Inventors: Franco Marciandi; Marco Bertani, both of Milan, Italy

[73] Assignee: Atohaas Holding C.V., Haarlem

[21] Appl. No.: 453,803

[22] Filed: May 30, 1995

[30] Foreign Application Priority Data

Jun. 1, 1994 [IT] Italy .................. MI94A1130

[51] Int. Cl.⁶ .................................. B32B 27/36
[52] U.S. Cl. ........................... 427/133; 427/135
[58] Field of Search ........................ 427/133, 135

[56] References Cited

U.S. PATENT DOCUMENTS 3,324,074  6/1967  McManimie .................. 526/279

FOREIGN PATENT DOCUMENTS

| | | |
|---|---|---|
| 0006308 | 1/1980 | European Pat. Off. ........ 427/133 |
| 0061245 | 9/1982 | European Pat. Off. . |
| 0217544 | 4/1987 | European Pat. Off. . |
| 0321193 | 6/1989 | European Pat. Off. . |
| 0027916 | 2/1991 | Japan .......................... 427/133 |
| 1328136 | 8/1973 | United Kingdom . |
| 1493393 | 11/1977 | United Kingdom . |

*Primary Examiner*—Peter A. Szekely
*Attorney, Agent, or Firm*—Burns, Doane, Swecker & Mathis, L.L.P.

[57] ABSTRACT

Molding process of articles having color contrast areas on the surface comprising the coating of the surface or of part of the surface of the mold with a colored composition polymerized before filling the mold with a polymerizable fluid composition wherein the colored composition is a fluid, stable and redispersable dispersion, comprising:

a) a solvent consisting essentially of polymerizable liquid monomers, optionally in admixture with a non-polymerizable volatile organic solvent;

b) from 0.1 to 10% by weight of a color composition as inorganic pigment or from 0.0001 to 1% by weight of an organic pigment or organic dye;

c) from 1 to 30% by weight of an unsaturated polyester resin soluble in the solvent a), the component a) being at least 20% by weight of the total composition.

7 Claims, No Drawings

PROCESS FOR PREPARING COLOR CONTRASTS ON ARTICLES OBTAINED BY MOLDING FROM POLYMERIZABLE COMPOSITIONS

The present invention relates to a process for obtaining a color contrast on a molded article surface and to the paint composition for obtaining the color contrast.

More particularly the composition containing the color is applied in a specific area of the mold surface where the article is to be formed by using a polymerizable composition.

It is known in the art that by molding techniques it is possible to obtain articles having a high surface finishing by using dispersions of a charge in a polymerizable liquid.

These polymerizable compositions are well known in the art and are fluid dispersions formed by polymerizable monomers based on methylmethacrylate containing high amounts of filler. See for instance European patent 321193, or U.S. Pat. No. 3,324,074, wherein the dispersions are obtained by using as dispersant a monomer silane.

Other types of compositions are known wherein a polymeric dispersant is used for obtaining dispersions, see for instance GB Patent 1493393.

The features of the dispersions obtained according to the indicated patents reside in that, though they contain a high amount of mineral filler, they are stably deflocculated or easily redispersable in the polymerizable monomer contained therein.

These compositions are used to form molded articles such as sanitary articles in general, endowed with the essential feature to have a high finishing surface.

It is also known to supply finished surfaces of molded articles having a color contrast on the piece surface.

The problems in this type of color contrasts are that the pigmented composition when applied on the mold must not be washed away at the time of the injection of the polymerizable composition which form the finished piece.

The finished piece with color contrast must have uniform coloring on the colored surface, exactly reproducing the imprint previously put on the mold, i.e. it must not show areas wherein the color is missing or others wherein the color has a different shade.

The known methods to obtain the color contrast in the art are represented by EP Patents 61245 and 217544.

In EP 61245 the composition for the color contrast requires, as an essential element, to contain a mixture of a finely subdivided filler, such as silica, and a pigment. In the patent it is shown with comparative examples that if the filler is missing it is not possible to obtain an homogeneous color contrast, but surfaces are obtained wherein color variations and dishomogeneities appear.

Clearly from the industrial point of view the products obtained in absence of silica have no utility.

In EP patent 217544, compared to EP 61245, are described compositions which would represent an improvement of the previous patent described above and in particular would avoid any possibility to obtain dishomogeneous surfaces.

The color contrast compositions are characterized in that they contain as an essential element a siccative alkyd resin and that the presence of silica for obtaining an homogeneous colored surface is no longer necessary.

Tests carried out by the Applicant have shown that many kinds of paints indicated as suitable in the two above patents are not capable of supplying homogeneous surfaces which can have an industrial utility even in the presence of siliceous mineral charge.

Moreover, also the resins giving the most homogeneous surfaces show superficial defects in the point wherein the polymerizable composition is injected.

The technical problems of the aforesaid patents have not yet found, therefore, a satisfactory technical solution.

The Applicant has unexpectedly and surprisingly found that it is possible to improve the techniques of color contrast obtaining homogeneous surfaces also in the injection point of the polymerizable composition if a particular type of polymer as filmogen agent is used as essential component of the colored composition.

Object of the present invention is a molding process of articles having areas of color contrast on the surface comprising the coating of the surface or of part of the surface of the mold with a colored composition polymerized before filling the mold with a polymerizable fluid composition wherein the colored composition is a fluid, stable and redispersable dispersion, which comprises:

a) a solvent consisting essentially of polymerizable liquid monomers, optionally in admixture with a non-polymerizable volatile organic solvent;

b) from 0.1 to 10% by weight of a coloring composition as inorganic pigment or from 0.0001 to 1% by weight of an organic pigment or organic dye;

c) from 1 to 30% by weight of an unsaturated polyester resin soluble in the solvent a);

optionally comprising one or more of the following components:

d) from 5 to 70% by weight on the total composition of a finely subdivided filler, with average diameter from 0.5 to 10 micron, preferably from 2 to 6 micron;

e) a polymeric viscosity regulator soluble in the solvent a) in amounts from 0.1 to 20% by weight, f) other polymeric or non polymeric additives, in amounts <5% by weight on the total of the components, acting as dispersants of the charge d), diluents, polymerization inhibitors, molecular weight regulators, polymerization activators, surfactants;

the component a) being at least 20% by weight of the total composition.

The components used in paints and in dispersions are obviously utilizable.

It is preferable that inorganic fillers are present to obtain a reduction of shrinkage phenomena during polymerization of the polymerizable composition to obtain the finished article and to increase the superficial hardness of the painted object.

In the preferred compositions the components range in the following ranges:

a) from 30 to 60% by weight;

b) from 2 to 4% by weight in case of inorganic pigments and from 0.01 to 0.5% by weight in the case of organic pigments;

c) from 1.5 to 5% by weight.

For the optional components the preferred ranges are:

d) from 20 to 50% by weight;

e) from 1 to 10% by weight;

f) from 0.5 to 10% by weight.

According to the present invention it is meant for filler an insoluble reinforcing substance added to the pigmented composition to confer mechanical properties to the colored surface without having any relevant effect on the color.

Both organic and inorganic pigments which can be used are those known in the art. The dispersion of said pigments may be favoured by the presence of small amounts of surfactants, for instance of alkylphenolethoxylates, polyglycols, etc.

Also the reinforcing fillers which may be used are well known and are described for instance in a previous patent application EP 321193 of the Applicant, in particular the sizes must be in the range lower than 20 micron, with an average diameter between 1 and 10 micron, preferably from 2 to 6 micron.

The polyester resins of the present invention are, as said, of unsaturated polyester type, well known in the art.

They are polyesters showing in their chain a high number of unsaturated groups of which at least some capable of copolymerizing with olefinic monomers.

They are produced by reaction of at least 2 components, a polyacid and a polyalcohol, of which at least a component contains unsaturations.

The weight average molecular weight is generally comprised between 5,000 and 20,000.

Polyacids can be in the form of diacids or under the form of anhydrides, generally with a number of carbon atoms from 2 to 20. Fumaric acid, maleic anhydride, phthalic- or isophthalic-, terephthalic anhydryde, adipic acid, terephthalic acid, tetrabromophthalic-, tetrahydrophthalic anhydride can be for instance utilized.

They can be utilized separately or in admixture with each other.

Polyalcohols have from 2 to 20 carbon atoms and contain from 2 to 20 hydroxylic groups, preferably from 2 to 6.

Among polyalcohols it can be cited ethylene-, propylene-, neopenthyl-, dibromoneopentyl glycol, butanediol, or hydroxylated derivatives containing aromatic or cycloaliphatic rings; they can be used alone or in admixture with each other. Polyalcohols with corresponding structures containing unsaturations can also be utilized.

Unsatured polyester resins are preferably crosslinked in the presence of olefinic monomers.

Crosslinking can occur by radical or peroxydic catalysts or by UV radiations.

As olefinic monomer, according to the present invention, an unsaturated monomer is meant. One can cite styrene, alphamethylstyrene, alkyl(meth)acrylate with alkyl from 1 to 18 carbon atoms, vinyltoluene, diallylphthalate, trimethylolpropandiallylether, (meth)acrylic esters of (poly)glycols or polyalcohols, such as for instance EGDM (ethyleneglycoldimethacrylate) and TEGDM (tetramethyleneglycoldimethacrylate), polyethylenglycol dimethacrylate, and pentaerythrite, vinylic esters such as for instance vinyl acetate.

The preferred systems for crosslinking are peroxides, optionally activated by cobalt organic salt or other metals and/or aromatic tertiary amines.

As cobalt salts, those soluble in colored compositions can be used as the preferred ones. For instance acetylacetonate, naphthenate, stearate, octoate, etc.

Examples of aromatic tertiary amines are dimethylaniline, diethylaniline, dimethylparatoluidine.

In case of UV radiations it is necessary to add the promoters activatable by the same radiations, for instance benzophenonenic compounds.

Component a) of the polymerizable monomer type is indicated hereunder. As already said, a) can be used also in admixture with a non polymerizable solvent. This last must be sufficiently volatile to be removed for the most part before introducing the hardenable composition; in any case it must be a solvent for the unsaturated polyester resin. Examples of non polymerizable solvents are aromatic hydrocarbons, ketones, saturated esters, ethers, etc.

The polymeric viscosity regulating component is a preformed polymer compatible with the polymer obtained by polymerization of component a), and, anyway, such as not to sensitively reduce the physical properties of the colored coating. Well known examples of polymers utilized for the viscosity variation also when employed in small amounts, up to 20% by weight at most with respect to monomer a), more preferably from 1 to 10%, are homopolymers or copolymers of methylmethacrylate with other comonomers, in amounts up to 40% by weight, preferably up to 10% by weight. For instance they are polymethylmethacrylate, methylmethacrylate/acrylate of methyl or ethyl copolymers, methylmethacrylate/styrene copolymers, methylmethacrylate/methacrylic acid copolymers, methylmethacrylate/γ-methacryloxypropyltrimethoxysilane copolymers.

They have generally a weight average molecular weight from 10,000 and 1,000,000, preferably from 20,000 and 100,000.

The additives f) comprise additives of common use in the technique of paints dispersions. For instance polymeric or non polymeric dispersants of the pigment and of the charge d) when present; slow thinners, latent solvents to regulate the forming of the colored coating; polymerization inhibitors of the type normally used of acrylic monomers, such as for instance hindered phenols, quinone, quinoethers; molecular weight regulators which intervene during the film forming regulating the molecular weight of the film itself, such as for instance mercaptanes, terpinolene, etc.; polymerization activators such as cobalt salt previously indicated; surfactants as wetting agents for pigments and fillers, such as for instance alkylphenolethoxylates.

The polymerizable composition to be utilized for forming the finished article is a fluid, stable, redispersable and hardenable dispersion formed by at least a polymerizable liquid monomer, a finely subdivided mineral filler, an agent silanizing the mineral filler and an hydrolysis catalyst of the silanizing agent selected from the ammonium salts of organic acids.

The polymerizable monomers are preferably alkyl esters of the acrylic or methacrylic acid, wherein the alkyl group contains from 1 to 6 carbon atoms. Preferred example is methylmethacrylate alone or in admixture with other acrylic, vinylic or styrenic monomers, up to 50% by weight.

As comonomers, methylmethacrylate, ethylmethacrylate, propylmethacrylate, styrene, etc. can be cited.

These polymerizable monomers are the same also utilizable as component a) of the colored composition.

The mineral fillers are inorganic substances having hydrophilic surfaces charaterized by the presence of polar groups, preferably hydroxylic groups. Examples are amorphous or crystalline silica, alumina, trihydrate alumina, mineral silicates, oxides.

The fillers are preferred to be spheroidal or granular-shaped, the use of needle-shaped particles not being however excluded.

The aforesaid fillers are maintained stably dispersed in the polymerizable monomer by silanization of the surface.

Examples of silanes used for silanization are methyltriethoxysilane, gamma-methacryloxypropyltrimethoxysilane, vinyltriethyoxysilane, etc.

The fluid polymerizable compositions here summarized are described in detail in EP Patent 321193 incorporated herein. Examples of fluid polymerizable compositions using polymeric dispersants are those for instance of UK Patent 1493393 and UK 1328136, both incorporated herein by reference.

The polymerizable fluid compositions have generally low viscosities, about 100–1,000 cPoise, even though they can be utilized up to higher viscosities, generally 2,000–5,000 cPoise.

The colored compositions of the invention when applied to the mold surface supply a layer which remains attached to the mold surface during the subsequent filling with the polymerizable fluid composition, becoming integral part of the molded article during the hardening of the polymerizable fluid composition.

The process for obtaining molded materials with color contrast comprises therefore applying the colored composition of the invention, containing the desired contrast color on the desired mold surface, obtaining the coating, and subsequent filling with the polymerizable fluid composition to obtain the molded piece.

To obtain the coating of the color composition it is added before applying it to the mold surface a polymerization, a radical type initiator of the same type as that used for the polymerization of the polymerizable fluid dispersion to obtain the finished piece.

The amounts of initiator are generally comprised from 0.01 to 2% of the total composition.

It can also be used a polymerization accelerator as activator, already described above.

During the polymerization of the last, a molded finished piece having the selected superficial parts colored, is therefore obtained.

The polymerization of the polymerizable composition is carried out by radical reaction catalyzed by peroxides with decomposition temperatures near those of the mold on which the colored composition is applied.

The temperature is generally comprised from 50° C. to 100° C.

Examples of peroxides are di(4-t.butylcyclohexyl)peroxides-dicarbonate, benzoylperoxide, etc.

After hardening the finished piece is discharged from the hot mold. The application of the colored composition for producing the subsequent piece is carried out immediately after the discharging.

The mold is maintained at high temperature during the coating and molding process with the colored compositions and during the subsequent filling of the mold with the polymerizable fluid composition.

The colored compositions of the present invention have the advantage to be hardened in a relatively short time, so the filling operation with the polymerizable fluid composition can be very quick.

As already said, the introduction of the polymerizable fluid composition does not cause any change in color or washing away of the colored surface also in the point of greater rate, i.e. in the point of introduction of the polymerizable fluid composition.

The fillers and polymerizable monomers of the colored compositions of the present invention are preferably the same of the polymerizable composition forming the finished piece.

The following examples are given for illustrative purpose and not limitative of the scope of the present invention.

EXAMPLE 1

Preparation of the coloring composition Methylmethacrylate (MMA)/γ-methacryloxypropyltrimethoxysilane (A1741) copolymer It was obtained by mass polymerization with weight ratio 98:2 and subsequently milled.

The weight average molecular weight was 200,000.
MMA/methacrylic acid (AMA) copolymer It was prepared by polymerization in aqueous suspension with weight ratio 98:2. The weight average molecular weight was 50,000.

Preparation of the methacrylic syrup

In a 2 l glass reactor the following components in g are mixed under stirring for 5 hours until dissolution of the (co)polymers.

| | |
|---|---|
| inhibited MMA with 200 ppm of TOPANOL ® A (2,4-dimethyl-6-t.butylphenol) | 900 |
| MMA/methyl acrylate copolymer with intrinsic viscosity 65 ml/g ALTUGLASS ® 9E | 59 |
| MMA/AMA copolymer 98:2 by weight (prepared above) | 13.6 |
| MMA/silane A174 copolymer 98:2 by weight (prepared above) | 13.6 |
| EGDM (ethylenglycoldimethacrylate) | 13.6 |
| terpinolene | 0.6 |

Preparation of the coloring paste In a 2 l high speed mixer of TURAX® type the following coloring paste comprising the following components (in g) stirring for 10 minutes is prepared:

| | |
|---|---|
| POLORAL ® G570 (unsaturated polyester resin by Galfstaff at 70% as residue in solvent styrene, acidity 13–18) | 33.7 |
| Nonylphenolethoxylate | 12.8 |
| TiO$_2$ white (of REPI) | 70 |
| Iron oxide red (of Bayer 130 M) | 105 |
| Light yellow 3R (of Bayer) | 464 |
| Vulcan P Black (of Cabot) | 11. |

The obtained mixture is passed twice on a three cylinder refiner to improve the pigment dispersion.

Preparation of the coloring dispersion

In a 5 l jar with china balls the following additives are mixed:

| | (in g) |
|---|---|
| methacrylic syrup (prepared above) | 1000 |
| butyl ester of glycolic acid (GB ester of Wacker) | 10 |
| nonylphenolethoxylate | 1.6 |
| finely subdivided silica (SICRON ® B 800 of Sibelco) | 774 |
| coloring paste (prepared above) | 105. |

The mixture is rolled for 16 hours and then it is added:

| | (in g) |
|---|---|
| hydroxyethylmethacrylate | 20 |
| trimethylolpropantrimethacrylate | 8 |
| MMA (containing 200 ppm of TOPANOL ®) | 104. |

The paint after 2 hours of mixing is used for forming the color contrast.

Application test 16 g of paint obtained above is diluted with 4 g of a mixture of non polymerizable solvents (butyl acetate butylcellosolve Solvesso 100) and supplemented with 0.08 g of PERKADOX® 16 (bis-4-ter-butylcyclohexylperoxydicarbonate).

It is stirred until PERKADOX® dissolves and the paint is then sprayed by aerograph with 0.7 mm nozzle on a part (male) of the steel metal mold, maintained at 80° C. by water circulation. The spraying pressure was 2.5 atm. It is let dry.

The mold is then closed and filled with the acrylic dispersion obtained according to example 2 of EP Patent 321193, to which 0.6% by weight of PERKADOX® 16 and 0.15 % of stearic acid have been added.

The temperatures of the mold male and female are respectively 80° C. and 70° C., by water circulation.

The temperature is then increased, after 10' of standing, gradually, to 90° C. both for the male and for the female.

It is maintained for 20 minutes at this temperature, then the male is cooled by cold water circulation and the mold is opened.

The molded article consists in a parallepiped-shaped tray having cm 240×240×180 sizes and 10 mm thickness. It reports quite reproduced and incorporated the part of the contrast paint previously sprayed on the metal mold, without traces of surface washing away.

The color results quite homogeneous in the surface part of molded article.

COMPARATIVE EXAMPLE 1A (to be compared with Example 1)

Example 1 was repeated wherein a corresponding amount of alkyd resin long-oil type SC 63 by the firm Benasedo (70% in dry in mineral turpentine as a solvent) was utilized instead of the unsaturated polyester resin.

The application test on mold has pointed out in the contrast colored surface some points wherein the paint was not present.

These areas are near the inlet point of the polymerizable fluid composition.

With respect to the finished article of Example 1, this piece cannot be used commercially.

COMPARATIVE EXAMPLE 1B (to be compared with Example 1)

Example 1 was repeated by using instead of the unsaturated polyester resin, a corresponding amount of epoxy resin (epoxyester resin) EPOBEN® L by Benasedo.

The application test has shown that it is not possible to obtain a color contrast as the resin is washed away when the polymerizable fluid composition is introduced, the surface part which has not been washed away shows dishomogeneity.

EXAMPLE 2

Example 1 is repeated by adding to the composition also 0.5% by weight of diallylphthalate as crosslinking accelerating agent.

A sink of optimal aesthetic aspect is obtained by operating in the same conditions.

The results are similar to those of Example 1.

We claim:

1. Molding process of articles having color contrast areas on the surface comprising coating the surface or part of the surface of a mold with a polymerized colored composition before filling the mold with a polymerizable fluid composition wherein the colored composition is a fluid, stable and redispersable dispersion, which comprises:
    a) a solvent consisting essentially of polymerizable liquid monomers, optionally in admixture with a non-polymerizable volatile organic solvent;
    b) a coloring composition comprising from 0.1 to 10% by weight of an inorganic pigment or from 0.0001 to 1% by weight of an organic pigment or organic dye;
    c) from 1 to 30% by weight of an unsaturated polyester resin soluble in the solvent a).

2. Process according to claim 1 wherein said colored composition comprises one or more of the following components:
    d) from 5 to 70% by weight on the total composition of a filler,
    e) a polymeric viscosity regulator soluble in the solvent with concentrations from 0.1 to 20% by weight,
    f) other polymeric or non polymeric additives in amounts <5% by weight on the total of the components acting as dispersants of the filler d), diluents, polymerization inhibitors, molecular weight regulators, polymerization activators, surfactants;

the component a) being at least 20% by weight of the total composition.

3. Process according to claim 2 wherein said colored composition comprises:

from 30 to 60% by weight of solvent a);

from 2 to 4% by weight of inorganic pigments or from 0.01 to 0.5% by weight of organic pigments;

from 1.5 to 5% by weight of said unsaturated polyester resin;

from 20 to 50% by weight of said filler;

from 1 to 10% by weight of said polymeric viscosity regulator.

4. Process according to claim 2 wherein said filler sizes are lower than 20 micron.

5. Process according to claim 1 wherein said unsaturated polyester resin shows in the chain unsaturated groups of which at least some are capable of copolymerizing with olefinic monomers.

6. Process according to claim 1 wherein said unsaturated polyester resin has a weight average molecular weight between 5,000 and 20,000.

7. Process according to claim 1 wherein said polymerizable fluid composition has a viscosity from 100 to 1,000 cPoise.

\* \* \* \* \*